(12) United States Patent
Capraro

(10) Patent No.: US 9,347,201 B2
(45) Date of Patent: May 24, 2016

(54) EMERGENCY EGRESS SYSTEM FOR A CONSTRUCTION MACHINE

(71) Applicant: Caterpillar Global Mining HMS GmbH, Dortmund (DE)

(72) Inventor: Sebastian Capraro, Dortmund (DE)

(73) Assignee: Caterpillar Global Mining LLC, Oak Creek, WI (US)

( * ) Notice: Subject to any disclaimer, the term of this patent is extended or adjusted under 35 U.S.C. 154(b) by 0 days.

(21) Appl. No.: 14/681,129

(22) Filed: Apr. 8, 2015

(65) Prior Publication Data

US 2015/0211208 A1  Jul. 30, 2015

(51) Int. Cl.
*E02F 9/08* (2006.01)
*B60R 3/02* (2006.01)

(52) U.S. Cl.
CPC ............... *E02F 9/0833* (2013.01); *B60R 3/02* (2013.01)

(58) Field of Classification Search
CPC ........... B60J 5/0486; B60J 9/02; B60R 3/005; B60R 3/007; B60R 3/02; B60R 9/0423; E06C 5/00; E06C 5/04; E06C 9/06; E02F 9/0833
USPC .............................. 296/190.03, 190.08, 146.1
See application file for complete search history.

(56) References Cited

U.S. PATENT DOCUMENTS

| 221,111 | A | * | 10/1879 | Skerritt | ...................... B60J 9/02 |
| | | | | | 105/438 |
| 383,588 | A | * | 5/1888 | Neumann | ................... B60J 9/02 |
| | | | | | 105/438 |
| 517,282 | A | * | 3/1894 | Leonard | ...................... B60J 9/02 |
| | | | | | 105/438 |
| 808,076 | A | * | 12/1905 | Felkner et al. | ............. B60J 9/02 |
| | | | | | 105/438 |
| 4,546,855 | A | | 10/1985 | Lyons | |
| 5,033,582 | A | | 7/1991 | Hoben | |
| 5,064,022 | A | * | 11/1991 | Graham | .................... B60R 3/02 |
| | | | | | 182/127 |
| 5,996,737 | A | | 12/1999 | Hedley et al. | |
| 8,011,474 | B2 | | 9/2011 | Boroski et al. | |
| 2002/0189899 | A1 | | 12/2002 | Hedley et al. | |
| 2013/0202395 | A1 | * | 8/2013 | Levi | ........................ B60R 3/005 |
| | | | | | 414/462 |
| 2014/0158464 | A1 | | 6/2014 | Nowak et al. | |
| 2014/0239609 | A1 | * | 8/2014 | Robertson | ................. B60R 3/02 |
| | | | | | 280/166 |
| 2015/0224936 | A1 | * | 8/2015 | Kichline, Jr. | .............. B60R 3/02 |
| | | | | | 182/84 |

* cited by examiner

*Primary Examiner* — Katherine Mitchell
*Assistant Examiner* — Shiref Mekhaeil

(57) ABSTRACT

An emergency egress system with an access panel assembly, a latch assembly, a handle assembly, a fixed ladder portion, and a slidable ladder portion, is disclosed. The access panel assembly includes a door panel. The latch assembly and the handle assembly are attached to the door panel. The handle assembly has a holding portion that works in conjunction with the latch assembly that has a wing portion. The holding portion is manipulable to rotate the latch assembly in the locked position to hold the fixed ladder portion and the slidable ladder portion together via the wing portion, which is to maintain the door panel in the closed position. The holding portion is manipulable to rotate the latch assembly to the unlocked position to allow the wing portion to rotate and release the slidable ladder portion for exit.

1 Claim, 4 Drawing Sheets

EMERGENCY EGRESS SYSTEM FOR A CONSTRUCTION MACHINE

TECHNICAL FIELD

The present disclosure relates to personnel safety in construction machines. More particularly, the present disclosure relates to an emergency egress system, which includes a modular ladder arrangement that functions in conjunction with an associated access panel assembly.

BACKGROUND

Machines, such as vocational vehicles, off-highway haul trucks, motor graders, wheel loaders, and other types of large machines associated with construction, mining, and other industries, often include operator station that may be elevated relatively significantly above a ground. The machine may include platforms, stairs, and other support structures that permit an operator to move to various access points on the machine. Some of the access points are used for ingress to and egress from the machine. The operator station may be accessible via an entry position that may be relatively close to the ground. For example, the entry position may be linked to the operator station via a set of stairs or other suitable access units. However, such arrangements may be up to two meters or more from the ground. To be well equipped to face emergency and/or unfavorable circumstances, the machine may include emergency exit equipment, such as ladder, stair, and/or the like, to facilitate exit of the operator from the machine. Conventional emergency exit devices are generally attached externally to the machine's walkway platform and in proximity of the operation position. This allows the operator to exit the machine via the emergency exit device.

However, attachment of the emergency exit device to the exterior of the machine may alter an outer specification of the machine and insecurely expose the emergency exit device to an outside environment. This may increase the risk of collision with and/or damage from external objects such as, a wall, doorway of a repair bay, and/or other components. Accordingly, the emergency exit device may become damaged or deformed when operated in rough environments. The present disclosure is directed at solving one or more of the above-mentioned problems of the current emergency exit systems in machines.

SUMMARY OF THE INVENTION

Various aspects of the present disclosure describe an emergency egress system for a construction machine. The emergency egress system includes a walkway platform in proximity of a cab. The walkway platform includes a first side attached to the construction machine and a second side opposed to the first side and distant from the cab. The emergency egress system includes an access panel assembly, a latch assembly, a handle assembly, a fixed ladder portion, and a slidable ladder portion. The access panel assembly is coupled to the walkway platform and includes a frame member and a door panel. The frame member is attached to the second side of the walkway platform. The door panel includes a first end and a second end. The first end is hinged to the frame member to allow for movement of the door panel between an open position and a closed position relative to the walkway platform. The second end is opposed to the first end and is structured to define a recess portion between the first side of the walkway platform and the door panel. The door panel includes a first surface directed towards an exit direction and a second surface proximal to the cab. The latch assembly is coupled to the second end of the door panel and to the first surface of the door panel. The latch assembly includes a first base member and a wing portion. The first base member is secured to the first surface of the door panel. The wing portion is attached to the first base member. The handle assembly is coupled to the second end of the door panel and the second surface of the door panel. The handle assembly includes a second base member and a holding portion. The second base member is secured to the second surface of the door panel such that the handle assembly works in conjunction with the latch assembly. The holding portion is attached to the first base member and is manipulable to rotate the latch assembly between a locked and an unlocked position. The fixed ladder portion includes a first end accommodated in the recess portion and is attached to the first side of the walkway platform in proximity to the cab. The slidable ladder portion includes a first end accommodated in the recess portion and is secured to the access panel assembly via the wing portion of the latch assembly, in the locked position. The holding portion is manipulable to rotate the latch assembly in the locked position to hold the fixed ladder portion and the slidable ladder portion together via the wing portion. This configuration facilitates the slidable ladder portion to be locked into the recess portion and maintains the door panel in the closed position. The holding portion is manipulable to rotate the latch assembly in the unlocked position to allow the wing portion to rotate. This configuration facilitates the slidable ladder portion to be unlocked for exit from the machine and for maintenance of the door panel in the open position.

DETAILED DESCRIPTION

Figure 1:
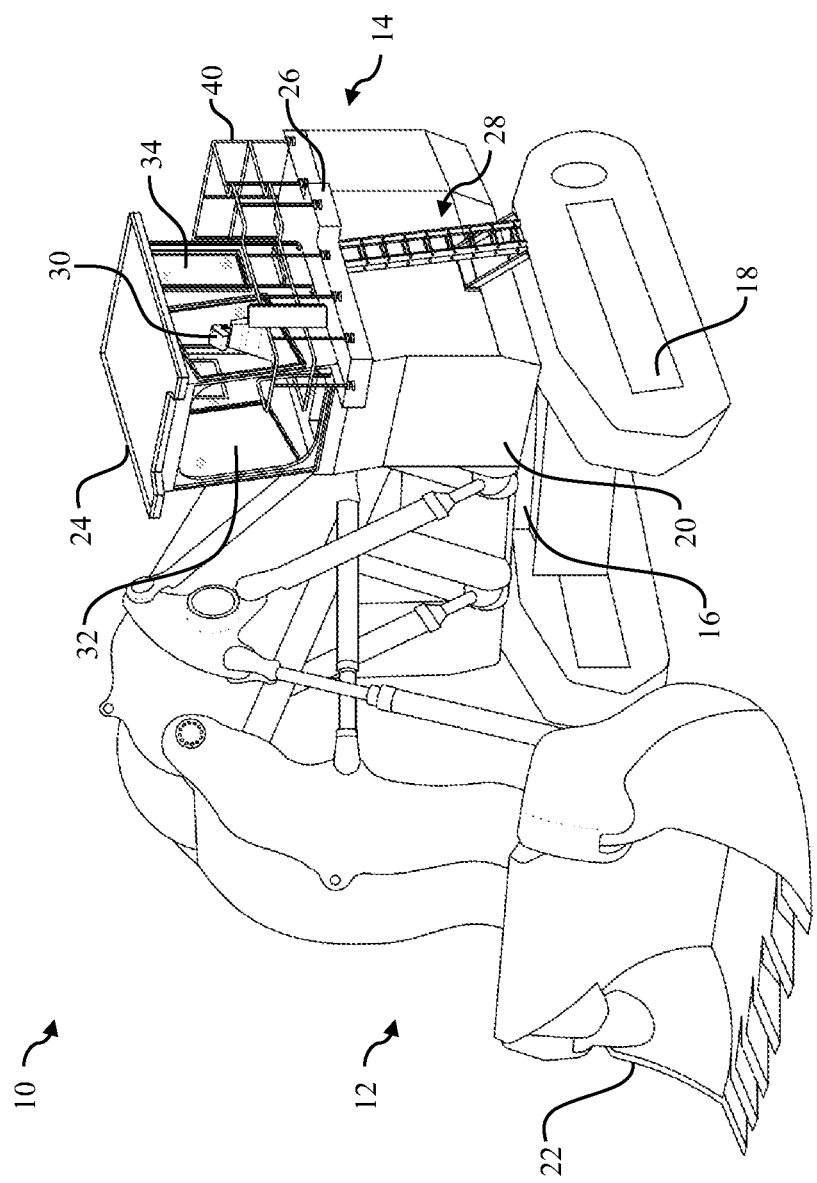
FIG. 1 is a perspective view of a construction machine with an emergency egress system, in accordance with the concepts of the present disclosure.

Referring to FIG. 1, there is shown a construction machine 10, which may be a moveable vehicle. The construction machine 10 includes a front end 12, a rear end 14, a frame 16, traction devices 18, a motor compartment 20, a work implement 22, a cab 24, a walkway platform 26, and an emergency egress system 28. The front end 12 includes the work implement 22. The rear end 14 includes the motor compartment 20, which may house a motor (not shown), a transmission, and/or other components (not shown) used to power the construction machine 10.

The frame 16 is attached to and supported on the one or more traction devices 18 in a manner known in the art. The frame 16 may embody a base that facilitates an operable connection between the one or more traction devices 18 and the motor (not shown). The traction devices 18 are powered and driven by the motor (not shown), to propel the construction machine 10 in a desired direction for operation. The motor (not shown) in the motor compartment 20 is supported by the frame 16 and configured to produce mechanical, hydraulic and/or electrical power output, which is used to drive the operation of a steering component (not shown) and the work implement 22.

The work implement 22 may alternatively, or additionally, be configured to pivot, rotate, slide, swing, or move relative to the frame 16. The work implement 22 may be operated from the cab 24. The cab 24 is supported on the frame 16. The cab 24 may also be open and may comprise a location from where an operator may operate the construction machine 10. The cab 24 includes an operator seat 30, a front observation window 32, an emergency exit window 34, and one or more operator interface devices (not shown).

The operator seat 30 is positioned proximal to rear of the front observation window 32, to provide an operator with a clear line of sight towards the rear of the construction machine 10, as well. The emergency exit window 34 extends rearwardly from the front observation window 32. The emergency exit window 34 is structured to facilitate exit of the operator from the cab 24, by breakage of the emergency exit window 34.

Figure 2:
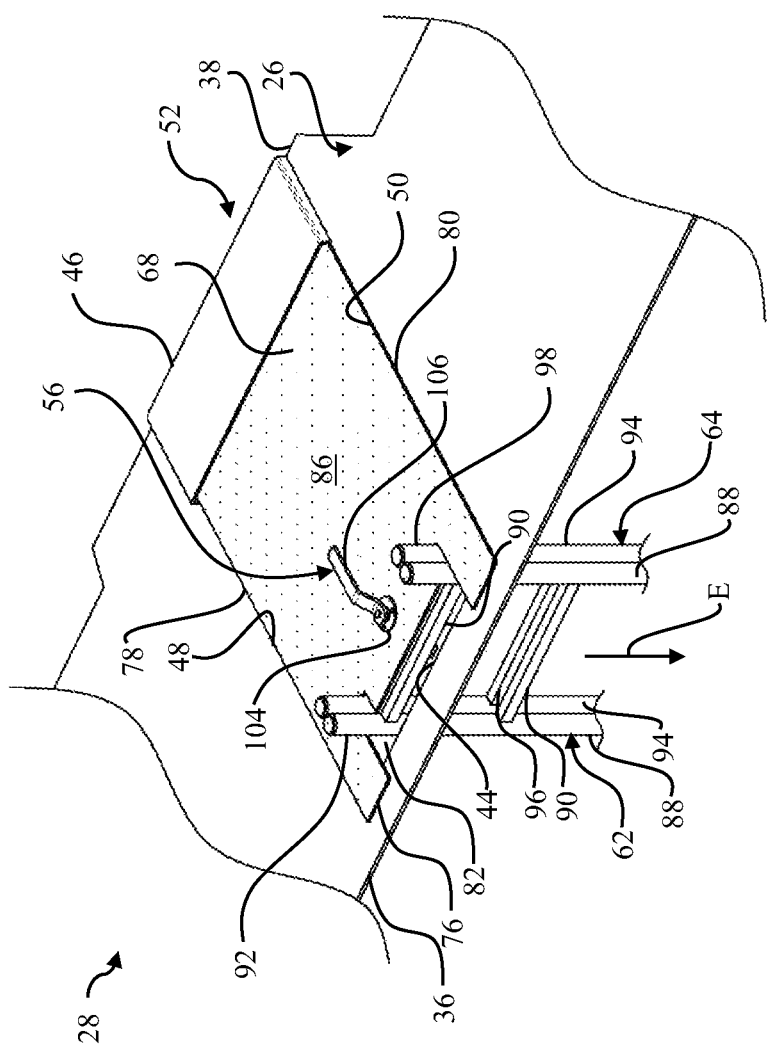
FIG. 2 is a perspective detailed view of the emergency egress system of FIG. 1, with a door panel in a closed position, in accordance with the concepts of the present disclosure.

The walkway platform 26 is adjacent the cab 24. The walkway platform 26 is positioned proximal to the cab 24, to provide access to the operator seat 30. The walkway platform 26 includes a first side 36 (FIG. 2) and a second side 38 (FIG. 2). The first side 36 is attached to the construction machine 10. The second side 38 is opposed to the first side 36 and is distal to the cab 24. The second side 38 is equipped with handrails 40 attached along a periphery (not shown), to allow a person to have support while accessing the walkway platform 26. The emergency egress system 28 is installed in proximity of the emergency exit window 34. This provides relative ease for an operator to access the emergency exit, via the emergency egress system 28, from the cab 24.

Figure 3:
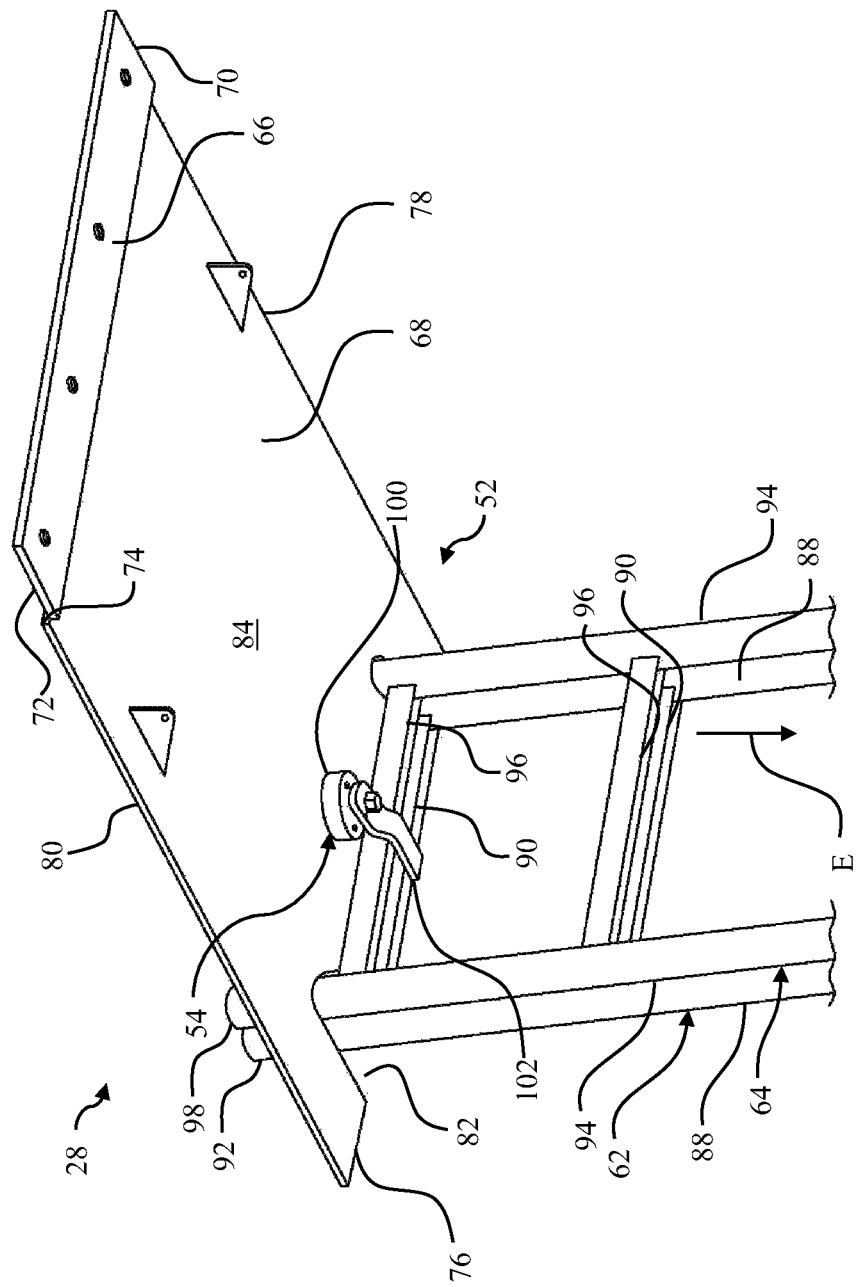
FIG. 3 is an underside perspective view of the emergency egress system of FIG. 1, with the door panel in the closed position, in accordance with the concepts of the present disclosure.

FIGS. 2 and 3 show the emergency egress system 28 in a closed position, relative to the walkway platform 26. A portion of the walkway platform 26 in front of the emergency exit window 34 defines a platform aperture 42 (shown in FIG. 4). As shown in the depicted configuration, the platform aperture 42 is closed by the access panel assembly 52. The platform aperture 42 facilitates an operator exit above the traction devices 18 (exit direction, E). The platform aperture 42 includes two longitudinal sides 44 and 46 and two lateral sides 48 and 50. The longitudinal sides 44 and 46 are aligned nearly parallel to the second side 38. The lateral sides 48 and 50 are nearly perpendicular to the longitudinal sides 44 and 46, and extend along a width of the walkway platform 26. In an embodiment, the longitudinal sides 44 and 46 and the lateral sides 48 and 50 may be aligned at different angles to each other.

Referring to FIG. 3, the emergency egress system 28 includes an access panel assembly 52, a latch assembly 54, a handle assembly 56, gas springs 58 and 60 (shown in FIG. 4), a fixed ladder portion 62, and a slidable ladder portion 64. The access panel assembly 52 includes a frame member 66 and a door panel 68. The frame member 66 includes a first end 70 and a second end 72. The first end 70 and the second end 72 are respectively attached to the lateral sides 48 and 50, and are proximal to the second side 38 of the walkway platform 26. The frame member 66 is positioned and aligned such that the frame member 66 is parallel to the second side 38 of the walkway platform 26. The frame member 66 is pivotally attached to the door panel 68. The door panel 68 includes a first end 74, a second end 76, a third end 78, and a fourth end 80. The first end 74 and the second end 76 are opposed and parallel to each other. The third end 78 and the fourth end 80 are opposed and parallel to each other. The first end 74 is hinged to the frame member 66, to allow movement of the door panel 68 between an open position and a closed position. In the closed position, the third end 78 and the fourth end 80 align with the lateral sides 48 and 50, respectively, and the second end 76 overlaps a portion of a topside of the walkway platform 26, to cover the platform aperture 42. Thus, in the closed position, the door panel 68 is supported by the walkway platform 26 at the second end 76. Further, in the closed position, the second end 76 defines a recess portion 82 between the first side 36 of the walkway platform 26 and the door panel 68. The recess portion 82 is bounded by the second end 76 of the door panel 68 and the longitudinal side 44 of the platform aperture 42. In addition, the door panel 68 includes a first surface 84 and a second surface 86. The first surface 84 is directed towards the exit direction (E). The second surface 86 is opposite of the first surface 84 and is proximal to the cab 24.

As shown in FIGS. 2 and 3, the emergency egress system 28 also includes the fixed ladder portion 62 and the slidable ladder portion 64. The fixed ladder portion 62 may be composed of aluminum, steel, or other metal. The fixed ladder portion 62 includes two longitudinal stiles 88 and one or more steps 90. The stiles 88 are equal and similar in structure and parallel to each other. Between the stiles 88, the one or more steps 90 are arranged and disposed to facilitate operator exit. The fixed ladder portion 62 may be attached to a portion of the construction machine 10 below or under the walkway platform 26. The fixed ladder portion 62 is attached to the first side 36 of the walkway platform 26. The fixed ladder portion 62 includes a first end 92, which is attached to the longitudinal side 44. In an embodiment, the first end 92 may be welded or screwed to the longitudinal side 44. The first end 92 of the fixed ladder portion 62 is accommodated in the recess portion 82, when the door panel 68 is in the closed position.

The slidable ladder portion 64 may also be composed of aluminum, steel, or other metal. The slidable ladder portion 64 includes two longitudinal stiles 94 and one or more steps 96. The stiles 94 are similar in structure and parallel to each other. Between the stiles 94, the one or more steps 96 are arranged to facilitate operator descent.

Further, the slidable ladder portion 64 is slidably attached to the fixed ladder portion 62. In an embodiment, two or more gliding components (not shown) may be provided to accommodate the stiles 88 and 94 of the slidable ladder portion 64 for facilitation of the sliding movement of the slidable ladder portion 64. The slidable ladder portion 64 also includes a first end 98, which is accommodated in the recess portion 82, between the door panel 68 and the fixed ladder portion 62, in a closed position. In an embodiment, the slidable ladder portion 64 is covered by the door panel 68. In an embodiment, when the height of the walkway platform 26 from a ground is more than six meters, the fixed ladder portion 62 and the slidable ladder portion 64, a cage portion (not shown) surrounds together the fixed ladder portion 62 and the slidable ladder portion 64. The cage portion (not shown) is provided for protection of the operator from the external environment and also, prevents the operator from falling down while exiting The door panel 68 is equipped and attached with the latch assembly 54 and the handle assembly 56. The latch assembly 54 is attached to the door panel 68, and is proximal to the second end 76. The latch assembly 54 is attached to the first surface 84 of the door panel 68, via conventionally applied fasteners. The latch assembly 54 includes a first base member 100 and a wing portion 102. The first base member 100 is nearly circular in shape. However, the first base member 100 may have other shapes structured to perform similar functions. The first base member 100 is secured to the first surface 84 of the door panel 68, via fasteners known in the art. The wing portion 102 is attached to the first base member 100 and extends in a direction nearly parallel to the walkway platform 26. The latch assembly 54 is configurable between a locked position and an unlocked position.

The latch assembly 54 is actuated by the handle assembly 56. The handle assembly 56 is rotatably attached to the second surface 86 of the door panel 68, and is proximal to the second end 76 via fasteners. The handle assembly 56 includes a second base member 104 and a holding portion 106. The second base member 104 is circular in shape. However, the second base member 104 may have other shapes structured to perform similar function. The second base member 104 is attached to the second surface 86 of the door panel 68, such that the handle assembly 56 works in conjunction with the latch assembly 54. The holding portion 106 is attached to the first base member 100 and extends from the first base member 100. The holding portion 106 is manipulable to rotate the latch assembly 54. The holding portion 106 is manipulable between a locked position and an unlocked position, which respectively corresponds to the locked position or the unlocked position of the latch assembly 54.

The holding portion 106 is manipulable to rotate the latch assembly 54 in the locked position to hold together the fixed ladder portion 62 and the slidable ladder portion 64, via the wing portion 102. In the closed position of the door panel 68, the wing portion 102 of the latch assembly 54 is in the locked position. In the locked position, the wing portion 102 underlays one step 90 and 96 each of the fixed ladder portion 62 and the slidable ladder portion 64. Further, in the locked position, the door panel 68 covers one step 96 of the slidable ladder portion 64. This holds the fixed ladder portion 62 and the slidable ladder portion 64 together, via engagement of the wing portion 102 during a non-applicable tenure of the emergency egress system 28. The wing portion 102 underlays the steps 90 and 96 of the fixed ladder portion 62 and the slidable ladder portion 64. This facilitates containment of the slidable ladder portion 64 in the recess portion 82 to maintain the door panel 68 in the closed position. Also, the engagement of the wing portion 102 with the step 90 of the fixed ladder portion 62 keeps the door panel 68 in the closed position. Similarly, the holding portion 106 is manipulable to rotate the latch assembly 54 in the unlocked position to rotate the wing portion 102 to deploy the door panel 68 to the open position.

Figure 4:
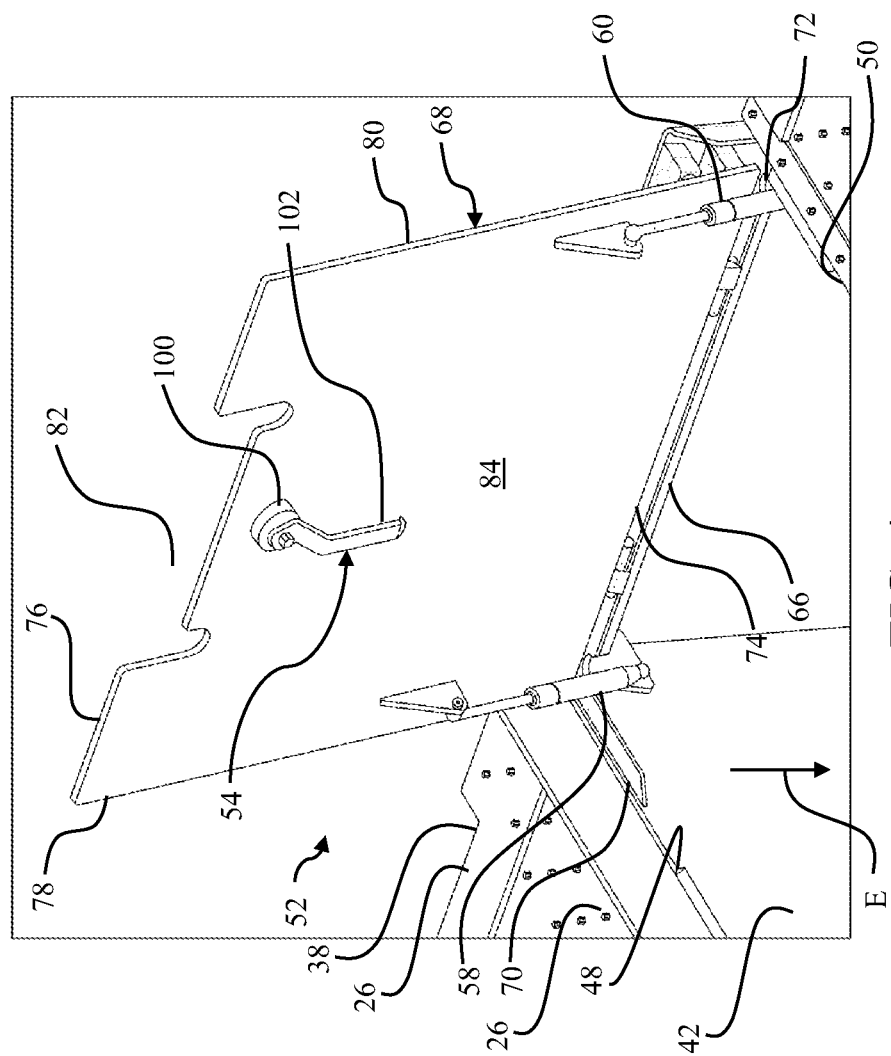
FIG. 4 is a perspective view of the emergency egress system of FIG. 1 with the door panel in an open position, in accordance with the concepts of the present disclosure.

Referring to FIG. 4, an open position of the door panel 68 is shown. In this position, the wing portion 102 of the latch assembly 54 is in the unlocked position. In the unlocked position, the wing portion 102 is disengaged with the steps 90 and 96 of the fixed ladder portion 62 and the slidable ladder portion 64. Disengagement of the wing portion 102 with the steps 90 and 96 of the fixed ladder portion 62 and the slidable ladder portion 64, unlocks the door panel 68. The door panel 68 may be maintained in the open position via the gas springs 58 and 60, which resiliently support the door panel 68. One gas spring 58 connects the door panel 68 to the frame member 66, in a location proximal to the third end 78. The other gas spring 60 connects the door panel 68 to the frame member 66 in a location proximal to the fourth end 80. The door panel 68 is maintained in the open position, via the gas springs 58 and 60 (FIG. 4). The gas springs 58 and 60 are configured to resiliently support the door panel 68. One gas spring 58 connects the door panel 68 to the frame member 66, in a location proximal to the third end 78. The other gas spring 60 connects the door panel 68 to the frame member 66 in a location proximal to the fourth end 80. However, the door panel 68 may be maintained in the open position manually by the operator (without gas springs 58 and 60). This makes the use of the gas springs 58 and 60 optional. Simultaneously, disengagement of the wing portion 102 with the steps 90 and 96 of the fixed ladder portion 62 and the slidable ladder portion 64 facilitates downward movement of the slidable ladder portion 64, towards the ground. Hence, this facilitates unlock and release of the slidable ladder portion 64 for exit from the construction machine 10.

INDUSTRIAL APPLICABILITY

In non-emergent operational situations, the door panel 68 is maintained in the closed position. In this position, the holding portion 106 is positioned such that the wing portion 102 underlays the steps 90 and 96 of the fixed ladder portion 62. Moreover, the wing portion 102 holds the steps 90 and 96 together in the recess portion 82.

In case of an emergency, the operator may break the emergency exit window 34 and move towards the walkway platform 26 adjacent to the emergency exit window 34. Thereafter, the operator may rotate or manipulate the holding portion 106 of the handle assembly 56 to open the door panel 68. The door panel 68 is held in the open position by means of the gas springs 58 and 60. Simultaneously, manipulation of the holding portion 106 may lead to movement of the wing portion 102, to unlock the slidable ladder portion 64. The slidable ladder portion 64 is hence, disengaged from the wing portion 102 and slides down from the recess portion 82. The slidable ladder portion 64 moves in the exit direction, E, towards the ground, due to weight of the slidable ladder portion 64 and gravity. This facilitates the operator's exit from the construction machine 10, which occurs first by a descent via the fixed ladder portion 62, and then, a descent via the slidable ladder portion 64.

The disclosed emergency egress system 28 provides for an efficient way to initiate the exit operation. As compared to the existing exit arrangements on construction machines, the ladder portions 62 and 64 are provided under the walkway platform 26. This mitigates damage to the structure of the ladder portions 62 and 64, when the construction machine 10 is operational in rough environments and/or is maneuvered through substantially narrow access routes.

The many features and advantages of the disclosure are apparent from the detailed specification, and thus, it is intended by the appended claims to cover all such features and advantages of the disclosure that fall within the true spirit and scope thereof. Further, since numerous modifications and variations will readily occur to those skilled in the art. It is not desired to limit the disclosure to the exact construction and operation illustrated and described, and, accordingly, all suitable modifications and equivalents may be resorted to that fall within the scope of the disclosure.

What is claimed is:

1. An emergency egress system for a construction machine including a walkway platform and a cab, the walkway platform is in proximity of the cab, the walkway platform includes a first side attached to the construction machine and a second side opposed to the first side and distant from the cab, the emergency egress system comprising:
an access panel assembly coupled to the walkway platform, the access panel assembly having a frame member and a door panel, the frame member attached to the second side of the walkway platform, the door panel having a first end and a second end, the first end being hinged to the frame member to allow movement of the door panel between an open position and a closed position relative to the walkway platform, the second end being opposed to the first end and structured to define a recess portion between the first side of the walkway platform and the door panel, the second end of the door panel being supported by the walkway platform, wherein the door panel includes a first surface directed towards an exit direction and a second surface proximal to the cab;

a latch assembly coupled to the second end of the door panel and to the first surface of the door panel, the latch assembly including a first base member and at least one wing portion, the first base member secured to the first surface of the door panel, the at least one wing portion attached to the first base member and extending therefrom;

a handle assembly coupled to the second end of the door panel and the second surface of the door panel, the handle assembly including a second base member and a holding portion, the second base member secured to the second surface of the door panel such that the handle assembly works in conjunction with the latch assembly, the holding portion attached to the first base member and extending therefrom, wherein the holding portion is manipulable to rotate the latch assembly between a locked position and an unlocked position;

a fixed ladder portion with a first end accommodated in the recess portion and attached to the first side of the walkway platform in proximity to the cab; and a slidable ladder portion with a first end accommodated in the recess portion and secured to the access panel assembly via the at least one wing portion of the latch assembly, in the locked position, wherein the holding portion is manipulable to rotate the latch assembly in the locked position for holding together the fixed ladder portion and the slidable ladder portion via the at least one wing portion, to facilitate locking the slidable ladder portion in the recess portion and maintaining the door panel in the closed position, wherein the holding portion is manipulable to rotate the latch assembly in the unlocked position to allow the at least one wing portion to rotate to facilitate unlocking of the slidable ladder portion for exit from the machine and facilitating the door panel in the open position.

* * * * *